(12) United States Patent
Robinson et al.

(10) Patent No.: US 9,575,514 B2
(45) Date of Patent: Feb. 21, 2017

(54) ENCLOSURE FEATURES OF A PORTABLE COMPUTING DEVICE

(71) Applicant: Apple Inc., Cupertino, CA (US)

(72) Inventors: Kevin M. Robinson, Sunnyvale, CA (US); Houtan R. Farahani, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/825,147

(22) Filed: Aug. 12, 2015

(65) Prior Publication Data

US 2016/0202735 A1    Jul. 14, 2016

Related U.S. Application Data

(60) Provisional application No. 62/101,838, filed on Jan. 9, 2015.

(51) Int. Cl.
*G06F 1/16* (2006.01)

(52) U.S. Cl.
CPC .................. *G06F 1/1679* (2013.01)

(58) Field of Classification Search
CPC combination set(s) only.
See application file for complete search history.

(56) References Cited

U.S. PATENT DOCUMENTS

| | | | |
|---|---|---|---|
| 6,911,601 B1 | 6/2005 | Gilbert et al. | |
| 7,407,202 B2 * | 8/2008 | Ye | E05B 63/248 292/121 |
| 7,480,132 B2 * | 1/2009 | Wu | G06F 1/1616 292/128 |
| 7,489,502 B2 * | 2/2009 | Hong | G06F 1/1616 361/679.55 |
| 7,495,898 B2 * | 2/2009 | Lo | G06F 1/1616 361/679.55 |
| 7,933,123 B2 | 4/2011 | Wang et al. | |
| 7,969,731 B2 * | 6/2011 | Yang | E05C 3/162 361/679.55 |
| 7,984,936 B2 * | 7/2011 | Lee | G06F 1/1616 292/150 |
| 8,164,898 B2 * | 4/2012 | Chen | H04M 1/0252 361/679.55 |
| 8,300,389 B2 * | 10/2012 | Kang | H04M 1/0254 361/679.01 |
| 8,773,846 B2 * | 7/2014 | Wang | G06F 1/184 206/286 |
| 9,048,665 B2 * | 6/2015 | Wojcik | H05K 5/0086 |
| 9,276,626 B2 * | 3/2016 | Rayner | G06F 1/1656 |
| 9,277,035 B2 * | 3/2016 | Sung | G06F 1/1679 |
| 2010/0296243 A1 | 11/2010 | Lu | |
| 2011/0193459 A1 | 8/2011 | Yang et al. | |

* cited by examiner

*Primary Examiner* — Lisa Lea Edmonds
(74) *Attorney, Agent, or Firm* — Downey Brand LLP

(57) ABSTRACT

An enclosure for a portable computing device is disclosed. The enclosure includes a top case and a bottom case. The bottom case includes a retention feature that receives a snap member. The top case includes a tapered protrusion that is received by the snap member in order to secure the top case to the bottom case. Other features may be included. For example, the retention feature may also receive a tab member that secures the snap member to the retention feature. The retention feature and the tapered protrusion allow for alternate securing means between the top case and the bottom case. As a result, fewer fasteners are required to secure the top case with the bottom case.

20 Claims, 14 Drawing Sheets

ENCLOSURE FEATURES OF A PORTABLE COMPUTING DEVICE

CROSS-REFERENCE TO RELATED APPLICATION(S)

This application claims the benefit of priority under 35 U.S.C §119(e) to U.S. Provisional Application No. 62/101,838, filed on Jan. 9, 2015, the disclosure of which is incorporated herein by reference in its entirety.

FIELD

The described embodiments relate generally to portable computing devices. In particular, the present embodiments relate to securing features of an enclosure of a portable computing device.

BACKGROUND

Portable computing devices, such as laptop computers, generally include an enclosure or housing designed to enclose several internal components. In some cases, the enclosure includes a top case secured to a bottom case. The top case may be secured to the bottom case using several fasteners. For example, the fasteners may extend through an opening in the bottom cases and engage the top case, or a threaded region of the top case.

However, an enclosure with multiple fasteners has drawbacks. For example, removing these fasteners corresponds to additional time dedicated to rework or repair operations, as all of the fasteners by be required to be removed. Also, several openings may expose the internal components to contaminants (e.g., liquids, dust). Other issues, such as additional machining time and additional parts, can be associated with multiple fasteners.

SUMMARY

In one aspect, an enclosure of a portable computing device is described. The enclosure may include a first portion including a protrusion extending from an interior portion of the first portion. The protrusion may include a tapered region. The enclosure may further include a second portion that includes an interior region that includes a retention feature that receives a snap member extending externally with respect to the retention feature. In some cases, the retention feature further receives a tab member that secures the snap member to the retention feature. In some embodiments, the tapered region engages the snap member to secure the first portion to the second portion.

In another aspect, a portable computing device is described. The portable computing device may include a top case that includes a protrusion. The protrusion may include a first tapered region and a second tapered region. The portable computing device may further include a bottom case that includes a retention feature. The retention feature may include a grooved region. The portable computing device may further include a snap member positioned within the grooved region. The snap member may include a first extension and a second extension, both of which may extend beyond the retention feature. The portable computing device may further include a tab member positioned within the grooved region and designed to secure the snap member to the retention feature. The tab member may include a first hook feature and a second hook feature. The first hook feature and the second hook feature are designed to secure the tab member to the retention feature. In some embodiments, the first tapered region and the second tapered region of the protrusion engage the first extension and the second extension of the snap member to secure the top case to the bottom case.

In another aspect, a method for assembling a portable computing device is described. The method may include receiving a snap member at a retention feature coupled with a bottom case of the portable computing device. The method may further include receiving, at the snap member, a protrusion coupled with a top case of the portable computing device.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
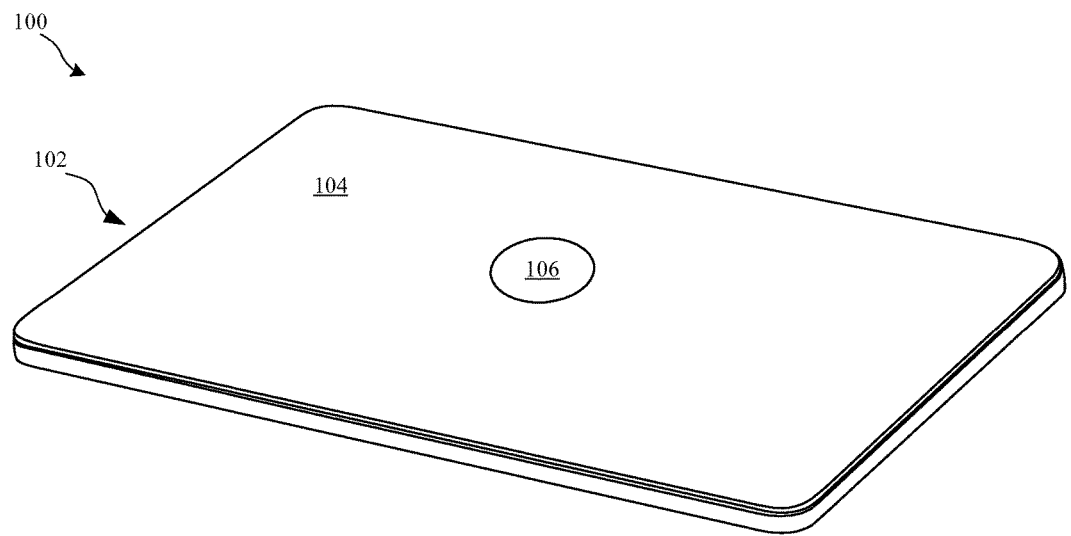
FIG. 1 illustrates an isometric view of an embodiment of a portable computing device in a closed configuration.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to features used to secure together structures of an enclosure of a portable computing device (e.g., laptop computing device). In particular, the disclosure relates to securing a top case of an enclosure to a bottom case of an enclosure. Generally, these features may be used as alternatives to using traditional fasteners extending through openings of the bottom case (or in some instances, the top case). In cases, the bottom case includes one or more retention features that may be integrally formed with the bottom case. The phrase "integrally formed" as used throughout this detailed description and in the claims refers to two or more structures formed from a single, unitary structure. For example, a single substrate (e.g., aluminum substrate) may undergo a material removal process to define the bottom case and the retention feature such that the bottom case and the retention feature are formed from the single substrate. The retention feature may further include additional material removed to define a grooved region. The grooved region includes a size and a shape capable of receiving a snap member used as a securing member for a protrusion, and in some cases, a snap member and a tab member used to secure the snap member to the retention feature (i.e., to secure the snap member at least partially within the grooved region).

The top case can include one or more protrusions, the number of which corresponds to the number of retention features of the bottom case. Each protrusion may include a tapered region, which includes, for example, a first tapered portion and a second tapered portion. In order to secure the top case to the bottom case, each protrusion is secured to a snap member (with each snap member positioned within a retention feature). The snap member is designed to include a preloaded force such that when the protrusion engages the snap member with a force greater than the preloaded force, the snap member opens or extends to receive the protrusion. The snap member then returns to its original position to engage the tapered region of the protrusion. The snap member coupled with the tapered region may define a retention force capable retaining the protrusion until a force greater than the retention force is applied to the protrusion and pulls the protrusion in a direction away from the snap member and the retention feature.

By using the protrusions and retention features described above, the number of fasteners may be reduced. Accordingly, the number of opening formed in the bottom case (or in some instances, the top case) can also be reduced. In some cases, the fasteners and opening may be eliminated.

These and other embodiments are discussed below with reference to FIGS. 1-29. However, those skilled in the art will readily appreciate that the detailed description given herein with respect to these Figures is for explanatory purposes only and should not be construed as limiting.

FIG. 1 illustrates an isometric view of an embodiment of a portable computing device 100 in a closed configuration. In some embodiments, the portable computing device 100 is a laptop computing device made by Apple, Inc., of Cupertino, Calif. As shown, the portable computing device 100 includes an enclosure 102 that includes a lid portion 104 that receives a display panel (not shown). The lid portion 104 may further include an indicium 106 that may be a logo, letter, or symbol. In the closed configuration the lid portion 104 is proximate to a top case 108.

Figure 2:
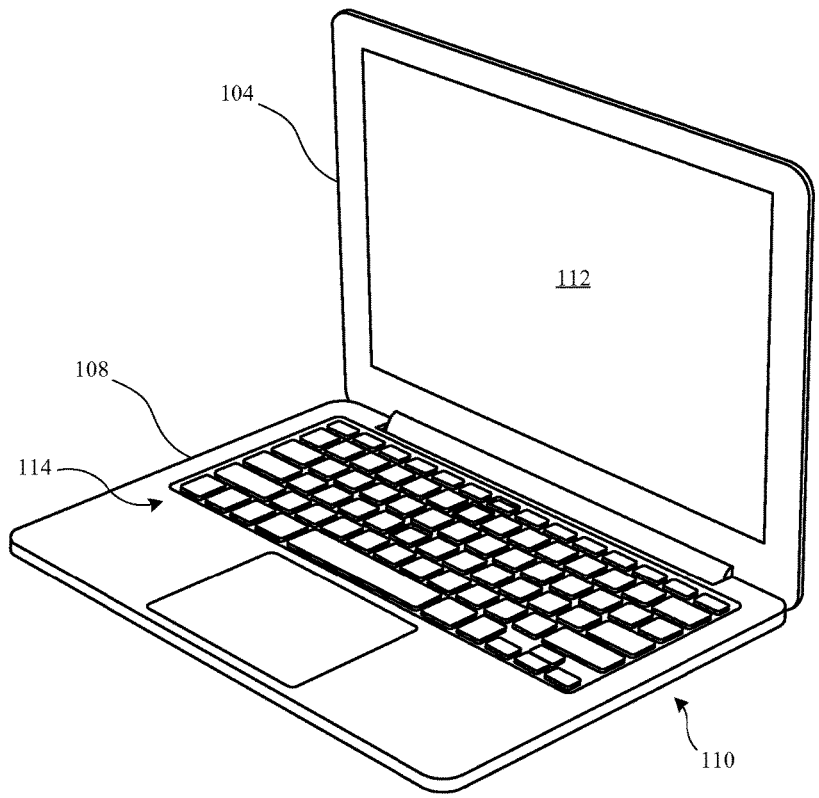
FIG. 2 illustrates an isometric view of the embodiment of the portable computing device shown in FIG. 1, with the portable computing device in an open configuration.

FIG. 2 illustrates an isometric view of the embodiment of the portable computing device 100 shown in FIG. 1, with the portable computing device 100 in an open configuration. As shown, the lid portion 104 includes a display panel 112 capable of displaying visual content. The top case 108 may include several openings to receive a keyboard 114. The top case 108 may further be coupled with (or secured to) a bottom case 110. The top case 108 and the bottom case 110 may be a first portion and a second portion, respectively, that combine to define a base portion that encloses several internal components (e.g., memory, processors, batteries, etc.). In other embodiments, the lid portion 104, the top case 108, and the bottom case 110 are formed from plastic. In the embodiment shown in FIG. 2, the lid portion 104, the top case 108, and the bottom case 110 are formed from a metal (for example, aluminum, steel, stainless steel).

Figure 3:
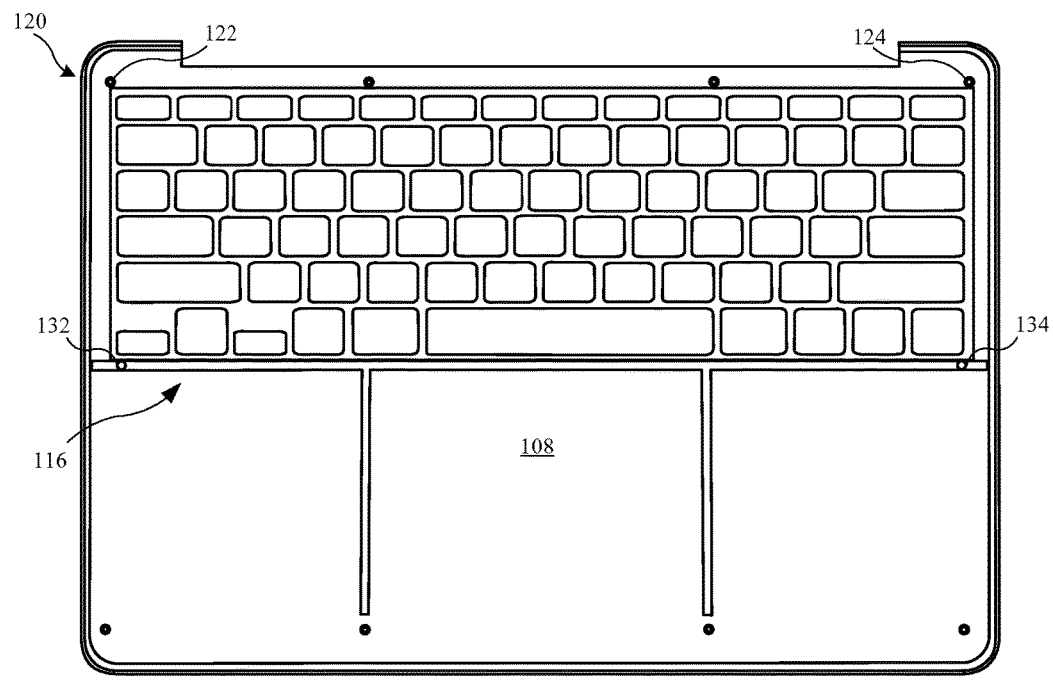
FIG. 3 illustrates a plan view of an interior portion of the top case shown in FIG. 2, in accordance with the described embodiments.

FIG. 3 illustrates a plan view of an interior portion 120 of the top case 108 shown in FIG. 2, in accordance with the described embodiments. The interior portion 120 of the top case 108 is generally associated with a region or surface not visible when the top case 108 coupled with a bottom case. For purposes of illustration, the internal components associated with the portable computing device 100 (shown in FIGS. 1 and 2) are removed. The top case 108 may be secured to the bottom case using several fasteners. Accordingly, the top case 108 may include several fastener receiving elements. For example, the top case 108 may include a first fastener receiving element 122 and a second fastener receiving element 124. In some embodiments, the first fastener receiving element 122 and the second fastener receiving element 124 includes threaded regions to receive fasteners that include corresponding threaded regions.

In order to reduce (or in some cases eliminate) the number of fasteners and corresponding fastener receiving elements, the top case 108 may include alternative features used to couple the top case 108 with the bottom case. For example, as shown in FIG. 3, the top case 108 may include a first protrusion 132 and a second protrusion 134 formed on a keyboard rib structure of the top case 108. The first protrusion 132 and the second protrusion 134 may couple with features on the bottom case, which will be described below. In some embodiments, the first protrusion 132 and the second protrusion 134 are formed from a hard plastic. In the embodiment shown in FIG. 3, the first protrusion 132 and the second protrusion 134 are formed from a metal (e.g., aluminum, steel). Generally, the first protrusion 132 and the second protrusion 134 can be formed from any relatively dense material that resists breaking or cracking when a force acts upon the first protrusion 132 and the second protrusion 134. Also, in some embodiments, the first protrusion 132 and the second protrusion 134 are integrally formed with the top case 108. In the embodiment shown in FIG. 3, the first protrusion 132 and the second protrusion 134 are adhesively secured to the top case 108. In other embodiments, a solder or weld may be used to secure the first protrusion 132 and the second protrusion 134 to the top case 108. Still in other embodiments, both the first protrusion 132 and the second protrusion 134 include a threaded region designed for threaded engagement with a threaded opening or threaded cavity of the top case 108. This feature will be shown below.

Figure 4:
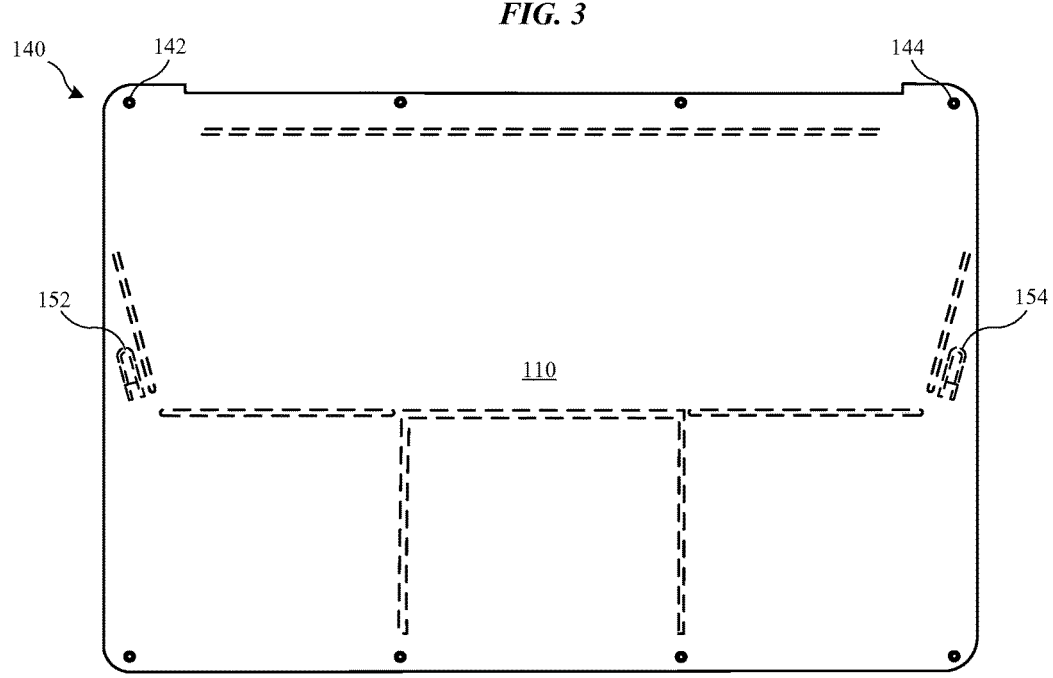
FIG. 4 illustrates a plan view of an exterior portion of a bottom case that may be coupled with the top case (shown in FIG. 3), in accordance with the described embodiments.

FIG. 4 illustrates a plan view of an exterior portion 140 of a bottom case 110 that may be coupled with the top case 108 (shown in FIG. 3), in accordance with the described embodiments. The exterior portion 140 of the bottom case 110 is generally associated with a visible region or surface that is visible when the bottom case 110 is coupled with the top case 108. The bottom case 110 may include several openings, each of which is designed to receive a fastener (not shown) such that the fastener engages a fastener receiving element (shown in FIG. 3) to couple the bottom case 110 to the top case 108. For example, the bottom case 110 includes a first opening 142 and a second opening 144, each of which are designed to receiving a fastener. In this manner, a fastener (not shown) may extend through the first opening 142 and engage the first fastener receiving element 122 (shown in FIG. 3). However, in order to reduce (or in some cases eliminate) the number of openings in the bottom case 110 and the number of fasteners used, the bottom case 110 may include several retention features. For example, the bottom case 110 shown in FIG. 4 includes a first retention feature 152 and a second retention feature 154, both of which are located on an interior portion of the bottom case 110 opposite the exterior portion 140. The first retention feature 152 and the second retention feature 154 may include additional structural elements designed to receive the first protrusion 132 and the second protrusion 134 (shown in FIG. 3), respectively.

Figure 5:
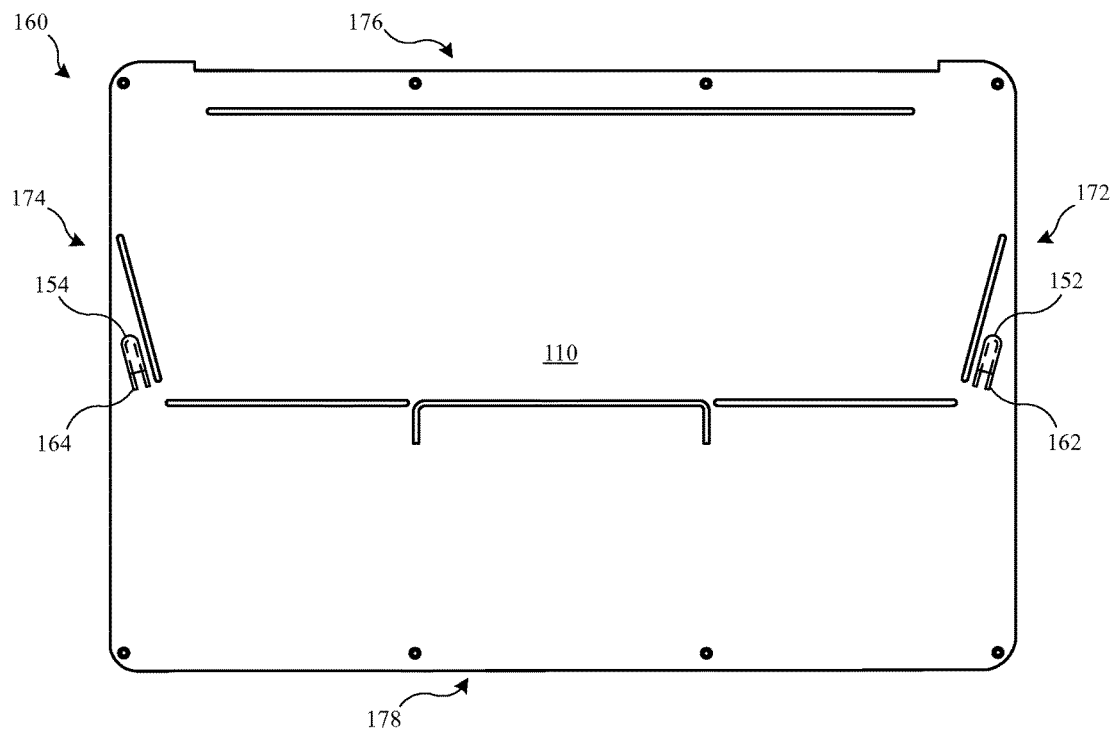
FIG. 5 illustrates a plan view of an interior portion of the bottom case shown in FIG. 4, in accordance with the described embodiments.

FIG. 5 illustrates a plan view of an interior portion 160 of the bottom case 110 shown in FIG. 4, in accordance with the described embodiments. As shown, the first retention feature 152 and the second retention feature 154 are located on a first side region 172 and a second side region 174, respectively, of the bottom case 110. However, it will be appreciated that the first retention feature 152 and/or the second retention feature 154 could be located anywhere along the bottom case 110, such as the third side region 176 or the fourth side region 178. Accordingly, the first protrusion 132 and the second protrusion 134 of the top case 108 (in FIG. 3) are generally located in positions corresponding to the location of the first retention feature 152 and the second retention feature 154. Further, in some embodiments, the bottom case 110 includes three or more retention features and, accordingly, the top case 108 includes a corresponding number of protrusions. Also, FIG. 5 shows the first retention feature 152 and the second retention feature 154 including a first snap member 162 and a second snap member 164, respectively. This will be discussed below.

In order to provide a retention force between the top case and the bottom case, each retention feature may include a snap member designed to receive and retain a protrusion. As such, the snap members allow the protrusions to "snap" into the snap member. Also, the snap member may include certain flexible properties designed to allow the snap member to deform such that a protrusion, and in particular a tapered region of the protrusion, may be secured within the snap member. However, the snap member is also designed to return to its original shape (prior to engaging a protrusion or receiving some external force) in order to retain the protrusion.

Figure 6:
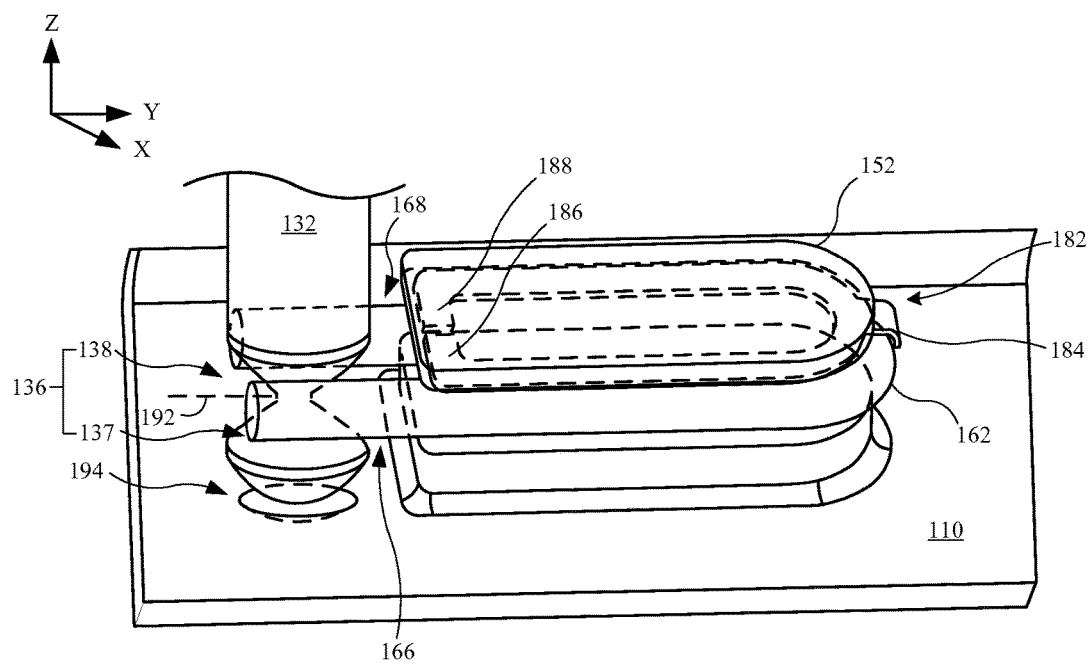
FIG. 6 illustrates an isometric view of an embodiment of a protrusion engaged with a snap member, the protrusion and the snap member designed to secure the top case to the bottom case.

FIG. 6 illustrates an isometric view of an embodiment of a first protrusion 132 engaged with a first snap member 162, with the first protrusion 132 and the first snap member 162 designed to secure and assemble a top case (e.g., top case 108) with a bottom case 110. For exemplary purposes, the protrusion may be the first protrusion 132 (shown in FIG. 3), the retention feature may be the first retention feature 152 (shown in FIG. 5), and the first snap member may be the first snap member 162 (shown in FIG. 5). Also, the first retention feature 152 may be designed to receive a first tab member 182. The first tab member 182 is designed to provide a tension to the first snap member 162 such that the first snap member 162 remains tensioned with (and positioned within) the first retention feature 152. Also, the first tab member 182 may include an extension 184 that may bend or curve around the first snap member 162 to further secure the first snap member 162 to the first retention feature 152.

Also, in some embodiments, the first retention feature 152 includes a size and a shape that allows the first snap member 162 to pivot, or "float," with respect to the first retention feature 152. This allows the first snap member 162 to move in the x- and/or y-dimension. In this manner, when the first retention feature 152 is lowered in a direction toward the first snap member 162, the first snap member 162 may adjust its positioning in the x- and y-dimensions to facilitate receiving the first protrusion 132. The design modification of a retention feature allowing a snap member to pivot in this manner will be shown and described below.

In some embodiments, the first protrusion 132 is integrally formed with the top case 108 (shown in FIG. 3). In the embodiment shown in FIG. 6, the first protrusion 132 is a separate structure mounted in the keyboard rib structure 116 (shown in FIG. 3) and mounted into a "blind hole" formed in the keyboard rib structure 116. A blind hole refers to a partial opening in a structure, with the opening not completely extending through the structure. Also, in some embodiments, the first protrusion 132 is formed from a metal injection molding ("MIM") process. In the embodiment shown in FIG. 6, the first protrusion 132 is formed from a material removal process similar to that of a screw. Also, the first protrusion 132 includes a tapered region 136 which includes a first tapered portion 137 and a second tapered portion 138. The first tapered portion 137 and the second tapered portion 138 may include an angle with respect to an imaginary horizontal line 192 that is parallel to the bottom case 110. The angles of the first tapered portion 137 and the second tapered portion 138 may be approximately in the range of 30 to 60 degrees with respect to the imaginary horizontal line 192. In the embodiment shown in FIG. 6, the angles formed by the first tapered portion 137 and the second tapered portion 138 is approximately 45 degrees with respect to the imaginary horizontal line 192.

The angle of the first tapered portion 137 and the second tapered portion 138 may be adjusted to increase or decrease the retention force defined by the force created between the tapered region 136 and the first snap member 162. For example, by lowering the angle of the second tapered portion 138, the retention force between the tapered region 136 and the first snap member 162 increases, and a force required to overcome the retention force to remove the first protrusion 132 from the first snap member 162 must be increased. In this manner, a snap retention force applied in a z-dimension to engage the first snap member 162 with the first retention feature 152 in a manner shown in FIG. 6 does not comprise the pivoting, or floating, capabilities of the first snap member 162. Also, as shown in FIG. 6, the bottom case 110 may include additional features, such as a cavity 194 that receives at least a portion of the first protrusion 132.

In some embodiments, the first retention feature 152 is adhesively secured to the bottom case 110. In other embodiments, the first retention feature 152 is welded to the bottom case 110. In the embodiment shown in FIG. 6, the first retention feature 152 is integrally formed with the bottom case 110. Accordingly, the first retention feature 152 is formed from the same material as that of the bottom case 110.

In some embodiments, the first snap member 162 is formed from a metal (e.g., steel, carbon steel). Generally, the first snap member 162 may be formed from any material having relatively high yield strength. In this manner, forces applied to the first snap member 162 may cause some deformation to the first snap member 162, yet the first snap member 162 will return to its original wire form shape when the force is no longer applied to the first snap member 162. As shown in FIG. 6, the first snap member 162 is generally defined by a U-shape wire form. However, the first snap member 162 may be defined by other wire form shapes. For example, the first snap member 162 may include a semi-circular region along with one or more linear regions (or linear extensions). In some embodiments, the first snap member 162 includes nickel plating. Further, the nickel plating may be a relatively dark color, such as black.

Also, as shown in FIG. 6, the first snap member 162 is designed to extend beyond the first retention feature 152 such that the first snap member 162 is capable of retaining the first protrusion 132, and in particular, the tapered region 136. The portion of the first snap member 162 extending beyond the first retention feature 152 may be defined by a first extension 166 and a second extension 168. As shown, the first extension 166 and the second extension 168 engage the tapered region 136.

In some embodiments, the first tab member 182 is formed form a metal (e.g., steel, stainless steel, aluminum). Also, the first tab member 182 may be independently formed with respect to the first retention feature 152. However, in other embodiments, the first tab member 182 integrally formed with the first retention feature 152 such that only an extension (e.g., extension 184) defines a tab member used to secure the first snap member 162. Further, the first tab member 182 may include a thickness approximately in the range of 0.1 to 0.3 millimeters. Also, in order to maintain the first tab member 182 within the first retention feature 152, the first tab member 182 include a first hook feature 186 and a second hook feature 188, as shown in FIG. 6.

It will be appreciated that the various features shown and described in FIG. 6 may be applied to other features associated with the top case and/or the bottom case. For example, the second retention feature 154 and the second snap member 164 (both shown in FIG. 5) may include any feature previously described for a first retention feature 152 and a first snap member 162, respectively.

Figure 7:
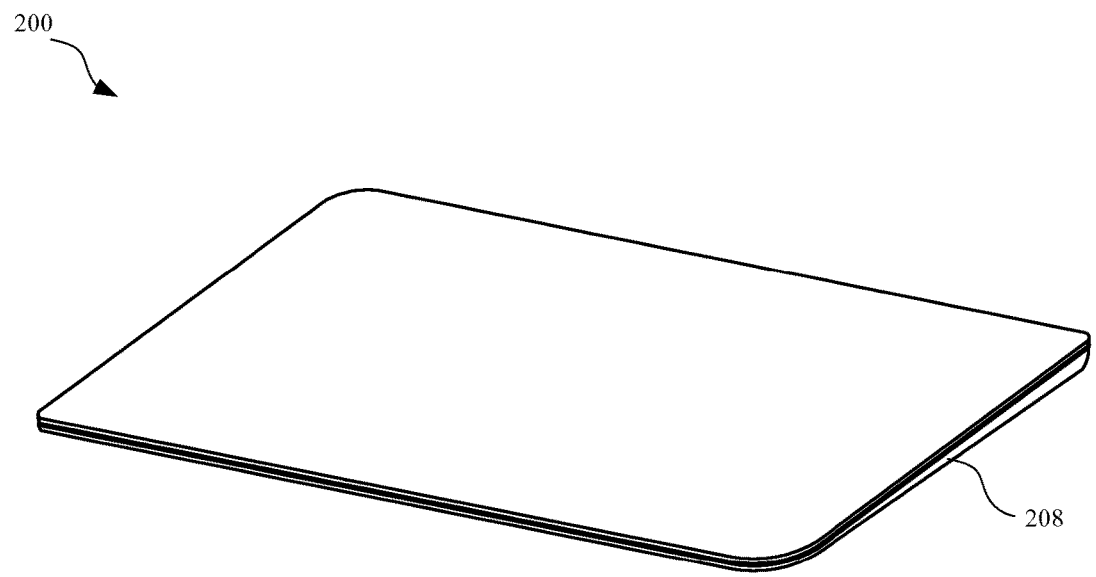
FIG. 7 illustrates an isometric view of an alternate embodiment of a portable computing device in a closed configuration.
Figure 8:
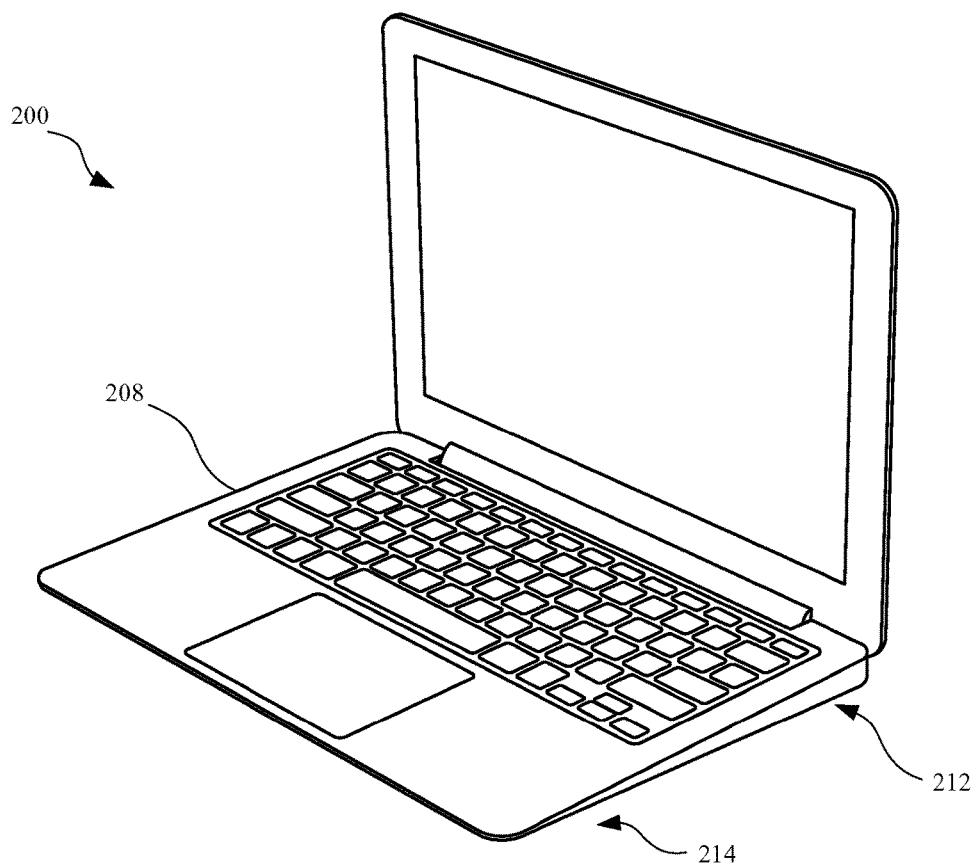
FIG. 8 illustrates an isometric view of the alternate embodiment of the portable computing device shown in FIG. 7, with the portable computing device in an open configuration.

FIGS. 7 and 8 illustrate an isometric view of an alternate embodiment of a portable computing device. As shown, the portable computing device 200 includes a top case 208. However, unlike the top case 108 (shown in FIGS. 1 and 2), the top case 208 includes a tapered region. In other words, the thickness of the top case varies. For example, the first region 212 of the top case 208 includes a first thickness and the second region 214 of the top case 208 includes a second region 214 having a second thickness less than the first thickness. In this manner, the portable computing device 200 includes less material which may correspond to a device having less weight than traditional devices. Also, the portable computing device 200 may include a bottom case coupled with the top case 208 such that the top case 208 and the bottom case, also referred to as a first portion and a second portion, respectively, combine to define a base portion that encloses several internal components.

Figure 9:
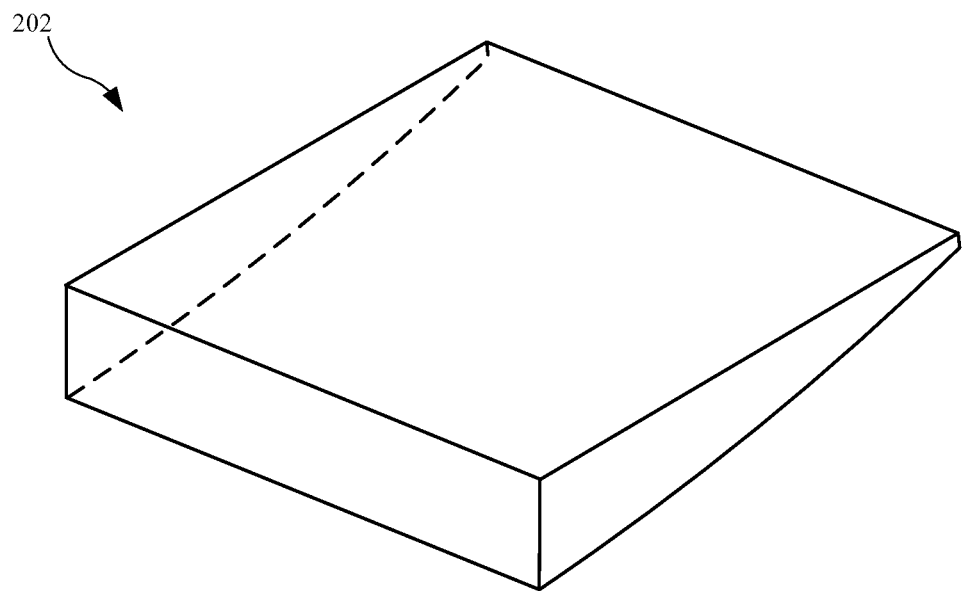
FIG. 9 illustrates an isometric view of a portion of an embodiment of a substrate, in accordance with the described embodiments.

FIGS. 9-13 illustrate a portion of a bottom case being formed to include a retention feature and also designed to receive various structures, such as a snap member and a tab member. FIG. 9 illustrates an isometric view of a portion of an embodiment of a substrate 202, in accordance with the described embodiments. In some embodiments, the substrate 202 is formed from a metal (e.g., aluminum). The substrate 202 may undergo a material removal process to form a bottom case (e.g., bottom case 110 shown in FIGS. 4 and 5) of a portable computing device.

Figure 10:
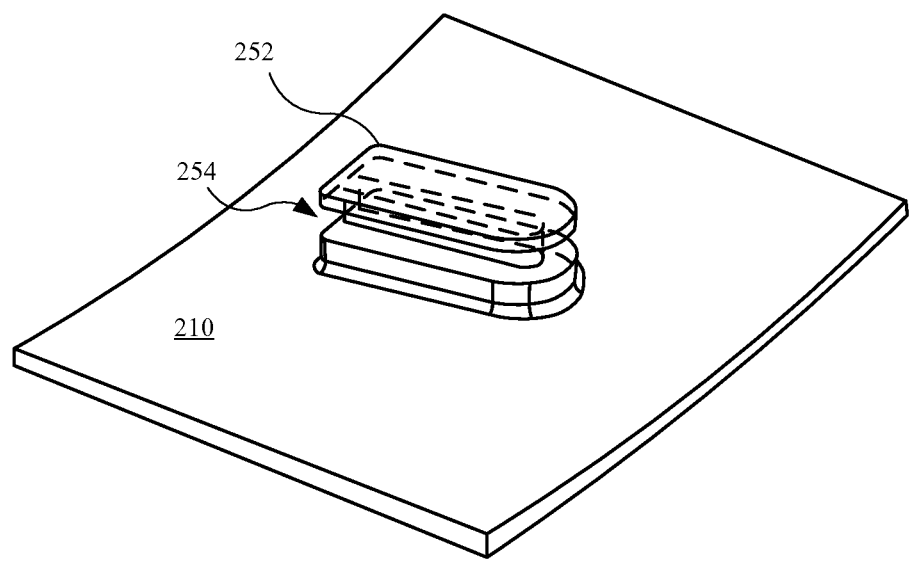
FIG. 10 illustrates an isometric view the portion of the substrate shown in FIG. 9 having undergone a material removal operation to form a portion of a bottom case and retention feature, in accordance with the described embodiments.

FIG. 10 illustrates an isometric view the portion of the substrate 202 shown in FIG. 9 having undergone a material removal operation to form a portion of a bottom case 210 and retention feature 252, in accordance with the described embodiments. As shown, the retention feature 252 includes a grooved region 254 extending around an outer region of the retention feature 252. The grooved region 254 may be formed by a material removal process (similar to the removal process used to form the retention feature 252), and designed to receive and retain other structural features (discussed below).

Figure 11:
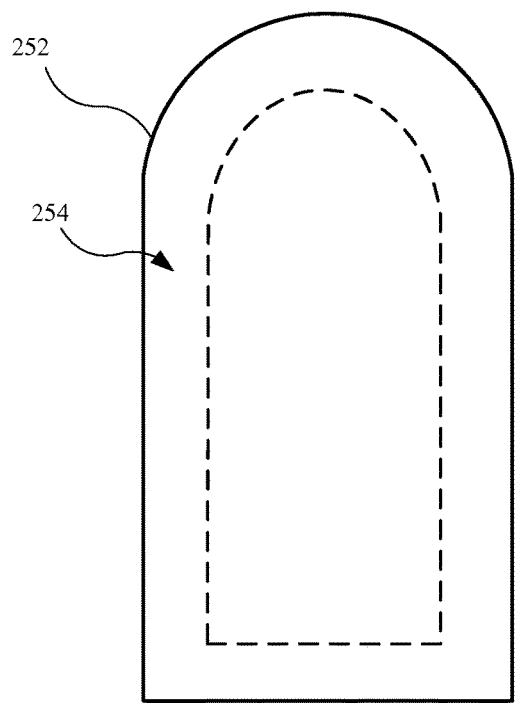
FIG. 11 illustrates a plan view of the retention feature shown in FIG. 10, in accordance with the described embodiments.
Figure 12:
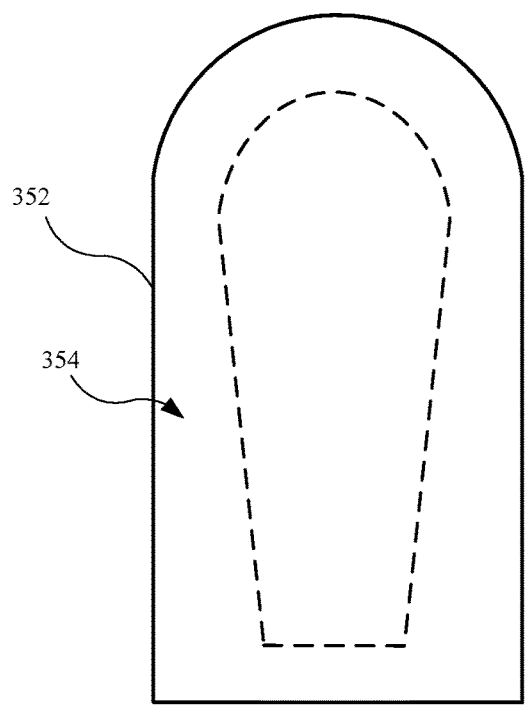
FIG. 12 illustrates a plan view of an alternate embodiment of the retention feature having a grooved region defined by an additional material removal region, in accordance with the described embodiments.

FIG. 11 illustrates a plan view of the retention feature 252 shown in FIG. 10, in accordance with the described embodiments. As shown, the grooved region 254 is generally symmetrical. FIG. 12 illustrates a plan view of an alternate embodiment of the retention feature 352 having a grooved region 354 defined by an additional material removal region, in accordance with the described embodiments. The grooved region 354 includes a volume greater than that of the grooved region 254 (shown in FIG. 11). This may allow for additional movement and/or positioning of structural features positioned within the grooved region 354. For example, the snap member 362 is able to pivot or rotate about the retention feature 352. This allows for some flexibility or additional tolerance for placement of a protrusion (not shown) of a top case. In other words, the snap member 362, having additional rotational movement due in part to the grooved region 354 of the retention feature 352, can rotate or pivot in a direction toward the protrusion to mechanically interlock with the protrusion.

Figure 13:
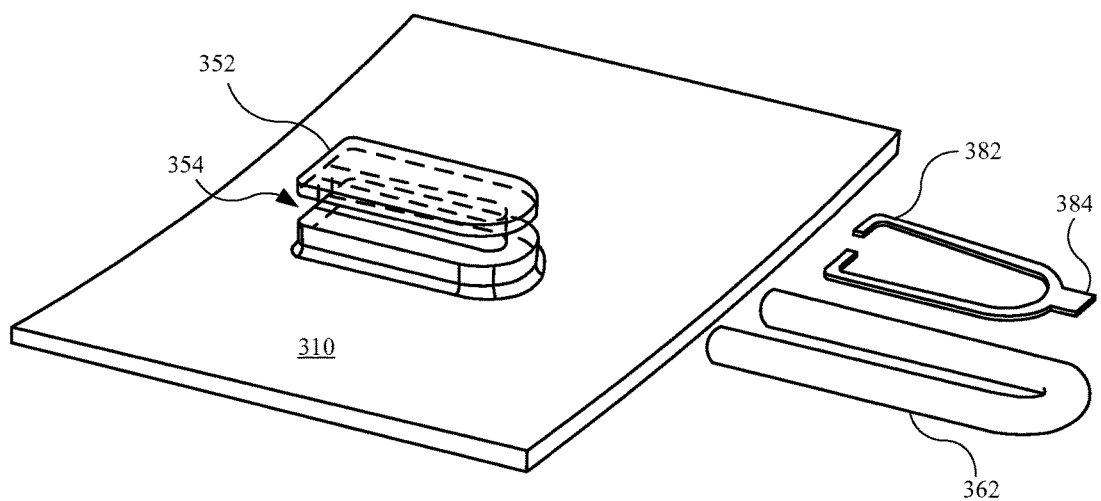
FIG. 13 illustrates an isometric view of the bottom case having the retention feature shown in FIG. 12, further showing a tab member and a snap member.

FIG. 13 illustrates an isometric view of the bottom case 310 having the retention feature 352 shown in FIG. 12, further showing a snap member 362 and a tab member 382. The grooved region 354 of the retention feature 352 includes a size and a shape to receive both the snap member 362 and the tab member 382. The tab member 382 is designed to retain the snap member 362 within the retention feature 352. In this regard, the tab member 382 may include an extension 384 design to bend or deform in response to a force. When the snap member 362 and the tab member 382 are secured within the retention feature 352, the extension 384 bends around the snap member 362. In addition, the tab member 382 may be bent or deformed such that the tab member 382 does not lie in a two-dimensional plane. Also, during assembly, the tab member 382 may be secured first within the retention feature 352. In this manner, the tab member 382 may create a pre-loading force to the snap member 362 when the snap member 362 is inserted into the retention feature 352. Also, in some embodiments, the extension 384 integrally formed with the retention feature 352 and the system shown in FIG. 13 does not require a tab member 382.

Figure 14:
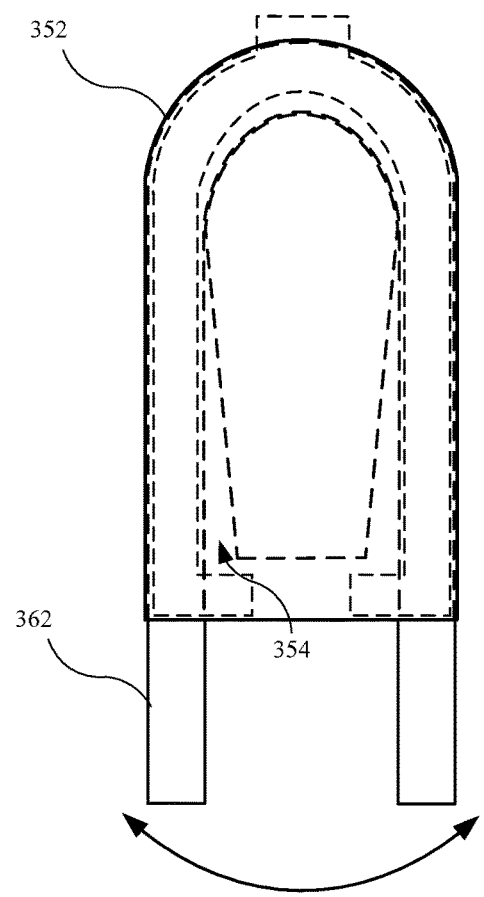
FIG. 14 illustrates a plan view of the retention feature, the tab member, and the snap member shown in FIG. 13, with the tab member and the snap member positioned with the retention feature.

FIG. 14 illustrates a plan view of the retention feature 352, the snap member 362, and the tab member 382 shown in FIG. 13, with the snap member 362 and the tab member 382 positioned with the retention feature 352. In particular, the snap member 362 and the tab member 382 are both positioned within the grooved region 354. With additional material removed, the retention feature 352 allows the snap member 362 to pivot or rotate with respect to the retention feature 352. The arrows denote the snap member 362 clockwise and counterclockwise rotational capability with respect to the retention feature 352. This accommodates for the bottom case (e.g., bottom case 310) and/or a top case to include some tolerances. For example, a protrusion designed to engage the snap member 362 may be positioned in different positions on a top case but if positioned within a specified tolerance, the snap member 362 can still receive the protrusion by some rotational movement.

Figure 15:
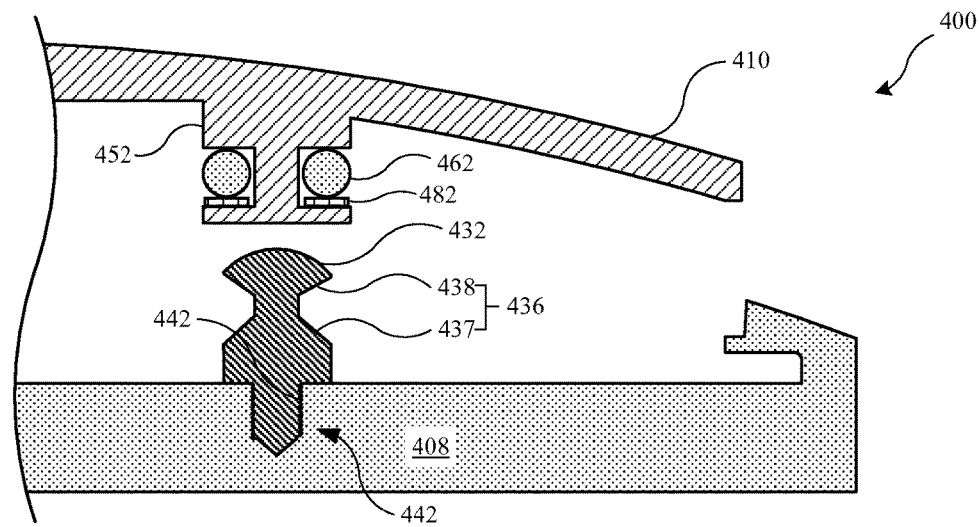
FIG. 15 illustrates a cross sectional view of a portion of a portable computing device, showing the bottom case including a retention feature having a snap member in a first position and a tab member positioned within the snap member as well as a top case including a protrusion, in accordance with the described embodiments.
Figure 16:
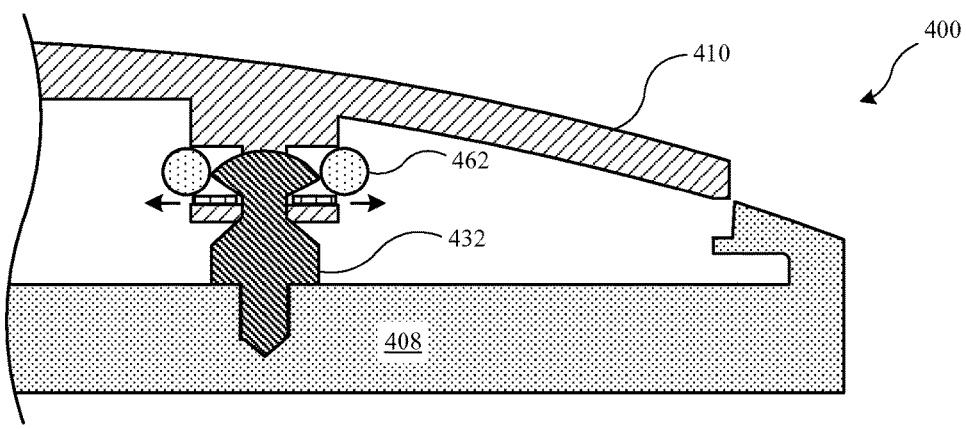
FIG. 16 illustrates a cross sectional view of the portable computing device shown in FIG. 15, with the snap member extending laterally to a second position as the protrusion engages the snap member.
Figure 17:
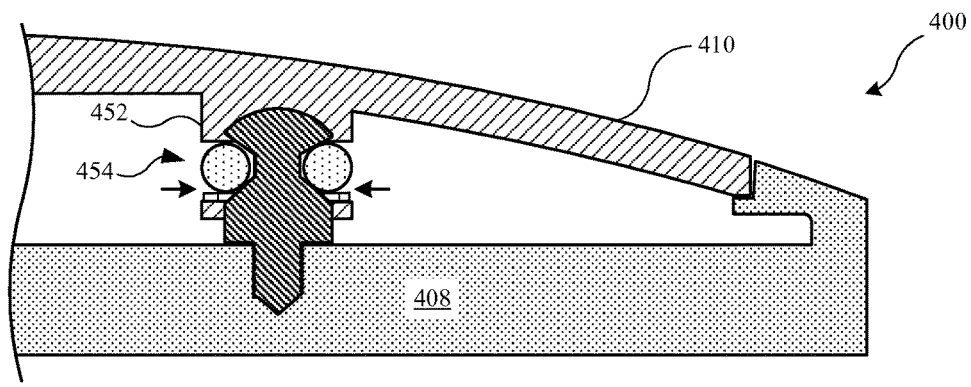
FIG. 17 illustrates a cross sectional view of the portable computing device shown in FIG. 16, with the snap member returning to the first position when the tapered region of the protrusion engages the snap member.

FIGS. 15-17 illustrate an embodiment of a bottom case 410 having a retention feature 452 secured to a top case 408 having protrusion 432. FIG. 15 illustrates a cross sectional view of a portion of a portable computing device 400, showing the bottom case 410 including a retention feature 452 having a snap member 462 in a first position and a tab member 482 positioned within the snap member 462 as well as a top case 408 including a protrusion 432, in accordance with the described embodiments. The protrusion 432 includes a tapered region 436 that includes a first tapered portion 437 and a second tapered portion 438. Also, the protrusion 432 may include a threaded region 442 designed for threaded engagement with a threaded opening 444 (or threaded cavity) of the top case 408. For example, the protrusion 432 may be screwed into the opening 444. Further, for additional securing, the threaded region 442 of the protrusion 432 may be adhesively secured with the threaded opening 444. It will be appreciated that the threaded region 442 of the protrusion 432 is representative of remaining protrusions, and also, the threaded opening 444 may be representative of remaining threaded openings designed for engagement with the remaining protrusions.

FIG. 16 illustrates a cross sectional view of the portable computing device 400 shown in FIG. 15, with the snap member 462 extending laterally to a second position as the protrusion 432 engages the snap member 462. In other words, a portion of the snap member 462 extends or deforms in a direction away from the protrusion 432. Generally, the lateral movement of the snap member 462 is along a plane parallel to the top case 408 as shown in FIG. 16.

FIG. 17 illustrates a cross sectional view of the portable computing device 400 shown in FIG. 16, with the snap member 462 returning to the first position (shown in FIG. 15) when the tapered region 436 of the protrusion 432 engages the snap member 462. The relatively high yield strength of the snap member 462 allows for a deformation of the snap member 462 from the first position to the second position, then back to the first position when tapered region 436 is positioned in a manner such that the top case 408 engages the bottom case 410. It will be appreciated that while the snap member 462 may be in a first position (as shown in FIG. 17), there may some slight deformation or bending of the snap member 462 due to engagement with the protrusion 432. Also, in cases where the grooved region 454 of the retention feature 452 includes an additional material removal region (e.g., FIG. 14), a force or tension exerted on the snap member 462 by the protrusion 432 limits (or in some cases prohibits) lateral movement of the snap member 462. As such, the snap member 462 is less inclined to move due to vibration that may occur, for example, at a certain frequency generated by an internal component (e.g., a speaker module) within the top case 408 and the bottom case 410.

Figure 18:
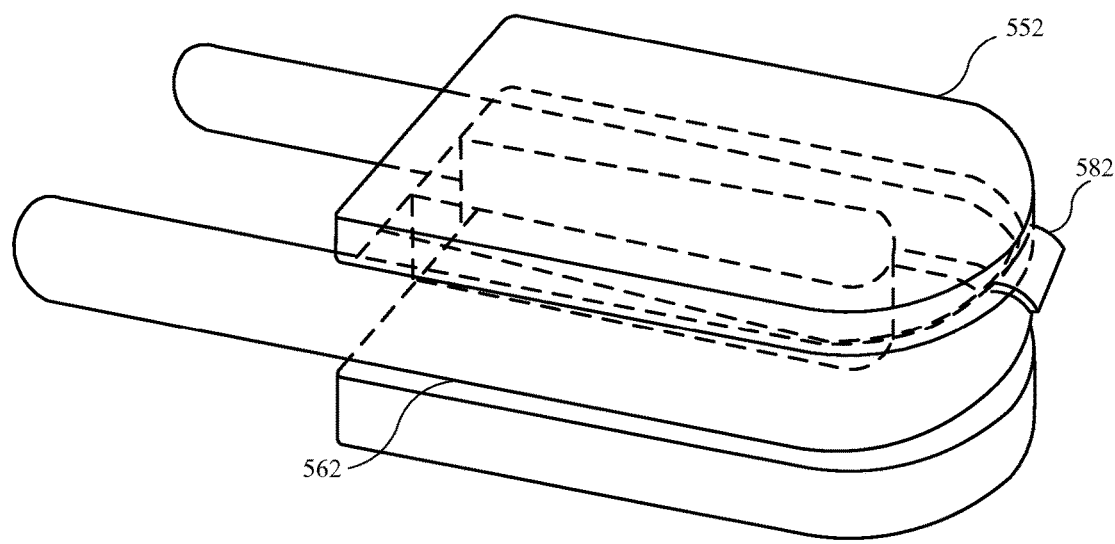
FIG. 18 illustrates an isometric view of an embodiment of a retention feature including a tab member integrally formed with the retention feature.

FIG. 18 illustrates an isometric view of an embodiment of a retention feature 552 including a tab member 582 integrally formed with the retention feature 552. Rather than include a separate tab member (e.g., tab member 382), the tab member 582 used to secure the snap member 562 within the retention feature 552 is already located on the retention feature 552. Once the snap member 562 is positioned within the retention feature 552, the tab member 582 may be deformed or bent to retain the snap member 562. This allows for fewer parts in a portable computing device. Also, the retention feature 552 may be secured to a bottom case of a portable computing device (not shown) by means such as adhesive securing, soldering, or welding. Alternatively, the retention feature 552 may be integrally formed with the bottom case. Also, some embodiments, the retention feature 552 includes a grooved region (similar to the grooved region 354 in FIG. 11) to allow the snap member 562 is able to pivot or rotate about the retention feature 552.

Figure 19:
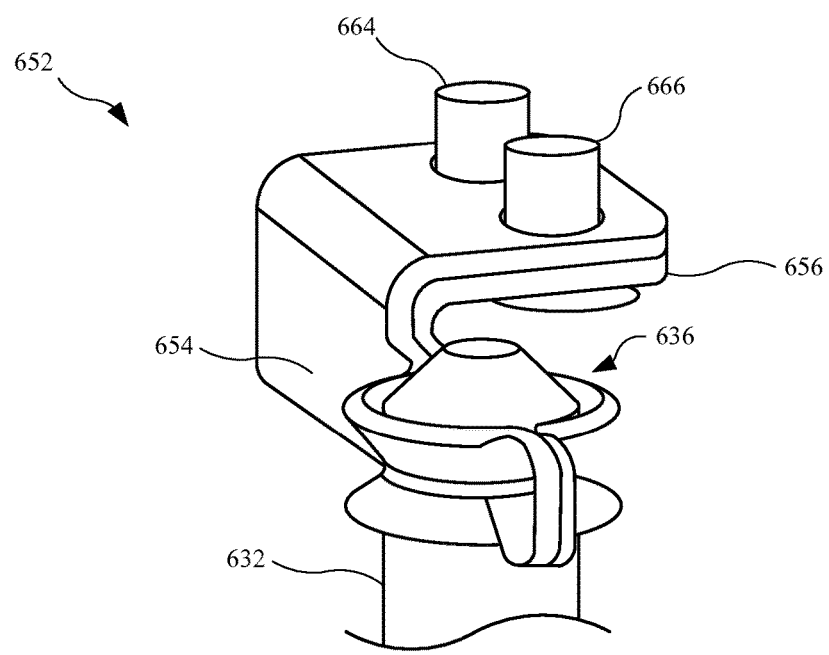
FIG. 19 illustrates an isometric view of an embodiment of a retention feature including a first section and a second section that combine to retain a tapered region of a protrusion.

FIG. 19 illustrates an isometric view of an embodiment of a retention feature 652 including a first section 654 and a second section 656 that combine to retain a tapered region 636 of a protrusion 632. As shown, the first section 654 is designed to surround a portion of the tapered region 636 while the second section 656 is designed to surround a remaining portion of the tapered region 636. In some embodiments, the first section 654 and the second section 656 are secured to a bottom case (not shown) by adhesively securing or by welding the first section 654 and the second section 656. In the embodiment shown in FIG. 19, the first section 654 and the second section 656 are secured by a first fastener 664 and a second fastener 666, both of which extend through openings of the first section 654 and the second section 656. Also, when a force is applied to the first section 654 and the second section 656 (for example, by the protrusion 632), a portion of the first section 654 and the second section 656 extend away from each other such that the tapered region 636 is secured between the first section 654 and the second section 656. Then, the first section 654 and the second section 656 to return to their respective original positions to retain the tapered region 636.

Figure 20:
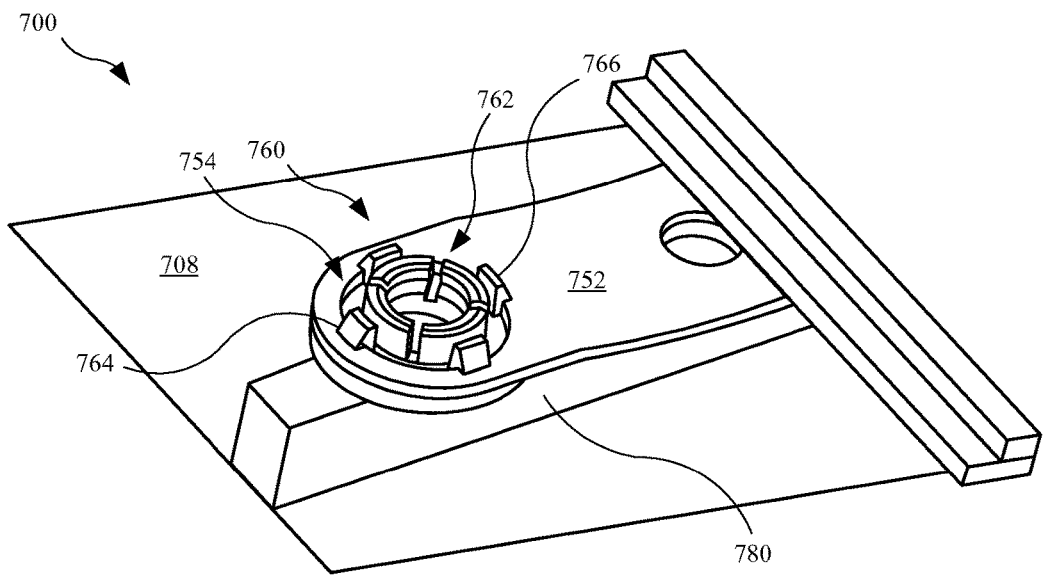
FIG. 20 illustrates an isometric view of an embodiment of a retention feature that retains a flexible feature.

FIG. 20 illustrates an isometric view of an embodiment of a retention feature 752 that retains a flexible feature 760. As shown, the flexible feature 760 is secured to a rib feature 780 located on a top case 708 of a portable computing device 700. However, in other embodiments, the flexible feature 760 is secured directly to the top case 708. The flexible feature 760 includes a central region 762 surrounded by several flexible portions, such as a first flexible portion 764 and a second flexible portion 766. Prior to the retention feature 752 receiving the flexible feature 760, when the flexible feature 760 engages an opening 754 of the retention feature 752, the flexible portions—such as the first flexible portion 764 and the second flexible portion 766—are actuated in a direction toward the central region 762. Once the flexible portions extend through the opening 754, the flexible flex portions extend away from the central region 762 and the flexible feature 760 is retained by the retention feature 752. In some embodiments, the flexible feature 760 is formed from a polymeric material (e.g., plastic). The flexible feature 760 is designed to be a simple feature that allows for quick retention with few parts.

Figure 21:
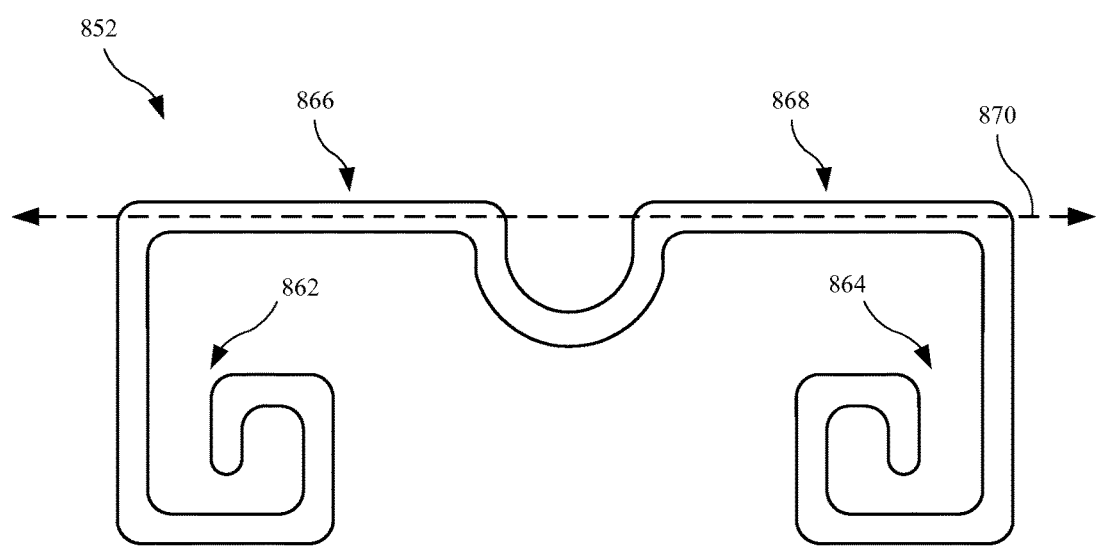
FIG. 21 illustrates a plan view of an embodiment of a retention feature formed from a wire form capable of retaining a protrusion.

FIG. 21 illustrates a plan view of an embodiment of a retention feature 852 formed from a wire form capable of retaining a protrusion. The retention feature 852 includes a first snap member 862 and a second snap member 864, both of which include multiple bends in the retention feature 852. Both the first snap member 862 and the second snap member 864 are capable of retaining a first protrusion and a second protrusion (not shown), respectively. The first snap member 862 and the second snap member 864 are generally flexible in response to a force (e.g., from a protrusion) that bends the first snap member 862 and the second snap member 864 in order to receive their respective protrusions. Once the force is no longer applied, the first snap member 862 and the second snap member 864 bend to their original respective positions to retain their respective protrusions.

Also, the retention feature 852 may further include a first elongated region 866 and a second elongated region 868. The first elongated region 866 and the second elongated region 868 may be able to twist or rotate about a longitudinal axis 870 (shown as an imaginary line extending through the first elongated region 866 and the second elongated region 868). Accordingly, first elongated region 866 and the second elongated region 868 may define a first torsional bar and a second torsional bar, respectively. The first elongated region 866 and the second elongated region 868 allow for additional flexibility in a portable computing device. For instance, the first elongated region 866 and the second elongated region 868 allow for the retention feature 852 to undergo stresses and other load bearing events (e.g., drop event of a portable computing device).

Figure 22:
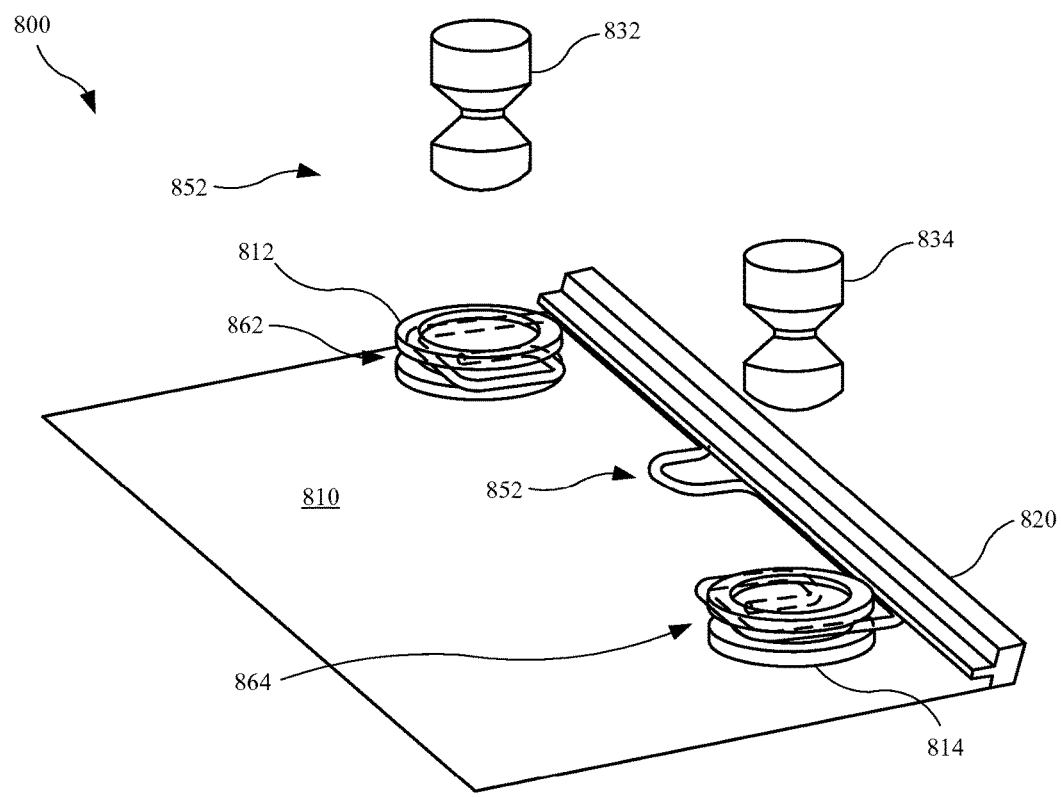
FIG. 22 illustrates the embodiment of the retention feature shown in FIG. 21 applied to a portable computing device to secure a portion of the portable computing device.

FIG. 22 illustrates the embodiment of the retention feature 852 shown in FIG. 21 applied to a portable computing device 800 to secure a portion of the portable computing device 800. As shown, the retention feature 852 may be secured to the bottom case 810 by, for example, a rail feature 820. The bottom case 810 includes a first button feature 812 and a second button feature 814 that receive the first snap member 862 and the second snap member 864, respectively. When a first protrusion 832 and a second protrusion 834, both of which may be secured to a top case (not shown) extend through the first button feature 812 and the second button feature 814, respectively, the first protrusion 832 and the second protrusion 834 engage the first snap member 862 and the second snap member 864, respectively, such that first snap member 862 and the second snap member 864 bend to receive the first protrusion 832 and the second protrusion 834. Then, after the tapered regions of the first protrusion 832 and the second protrusion 834 are positioned within the first snap member 862 and the second snap member 864, respectively, the first snap member 862 and the second snap member 864 return to their original respective positions to retain the first protrusion 832 and the second protrusion 834.

Figure 23:
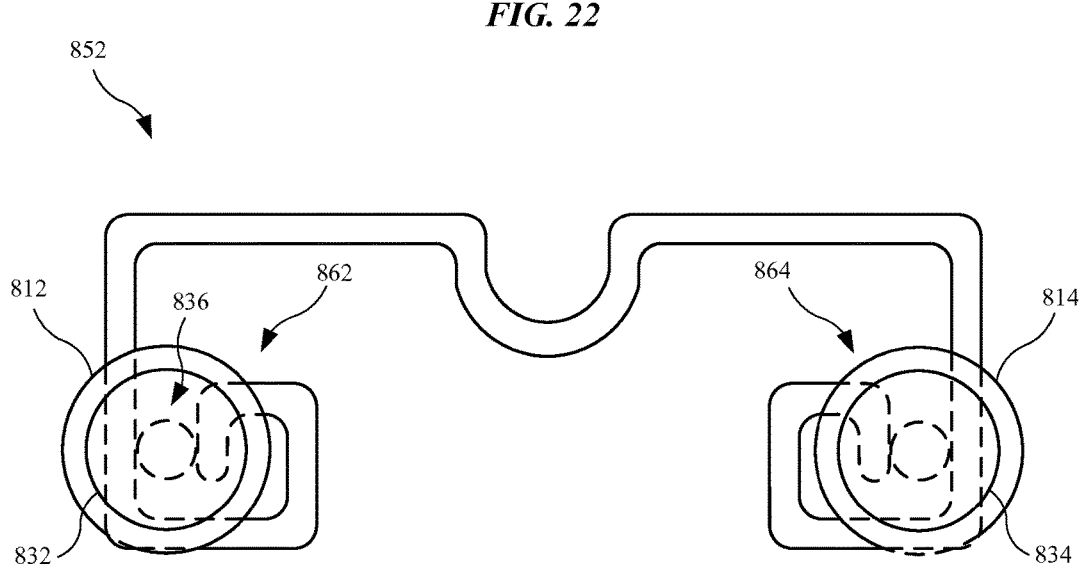
FIG. 23 illustrates a plan view of the retention feature shown in FIG. 22, with the retention feature receiving the first protrusion and the second protrusion.

FIG. 23 illustrates a plan view of the retention feature 852 shown in FIG. 22, with the retention feature 852 along with the first button feature 812 and the second button feature 814 receiving the first protrusion 832 and the second protrusion 834, respectively. For example, when the first protrusion 832 is positioned within the first button feature 812 and the first snap member 862, the first tapered region 836 of the first protrusion 832 engages the first snap member 862.

Figure 24:
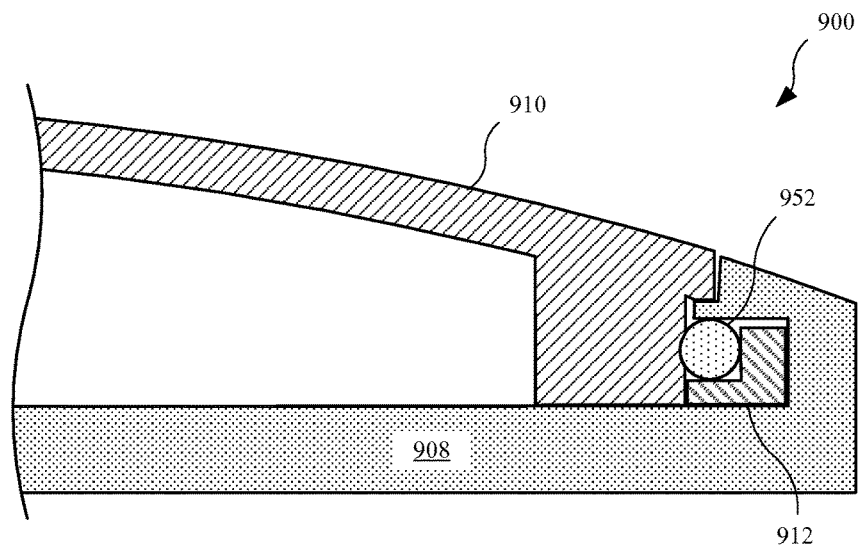
FIG. 24 illustrates a cross sectional view of an embodiment of a retention feature used to secure a top case and a bottom case of a portable computing device.

FIG. 24 illustrates a cross sectional view of an embodiment of a retention feature 952 used to secure a top case 908 and a bottom case 910 of a portable computing device 900. The retention feature 952 is designed to engage a retention receiving feature 912 secured to the top case 908, and also engage a bottom case 910 of a portable computing device 900. In this manner, when the top case 908 is engaged with the bottom case 910, the retention feature 952 applies a force to both the top case 908 and the bottom case 910 to provide a securing means between the top case 908 and the bottom case 910. In some embodiments, the retention feature 952 is made from a hard plastic or hard foam material. In the embodiment shown in FIG. 24, the retention feature 952 is made from a rubber material. Further, the retention feature 952 may extend around the outer peripheral region of the top case 908 and the bottom case 910.

Figure 25:
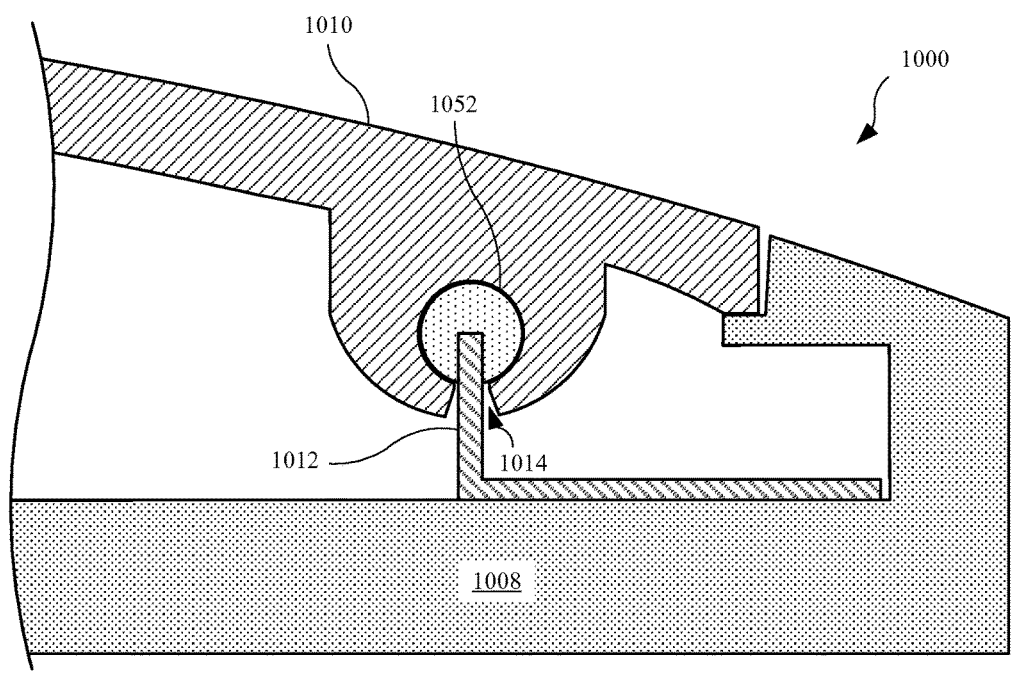
FIG. 25 illustrates a cross sectional view of an alternate embodiment of the retention feature shown in FIG. 24.

FIG. 25 illustrates a cross sectional view of an alternate embodiment of the retention feature 952 shown in FIG. 24. In FIG. 25, the retention feature 1052 is molded to a retention receiving feature 1012 of a top case 1008 of a portable computing device 1000. The retention feature 1052 may be made from any material previously described for a retention feature 952 (shown in FIG. 24). When the top case 1008 engages the bottom case 1010, the retention feature 1052 is deformed such that the retention feature 1052 is secured within a cavity 1014 of the bottom case 1010. When the retention feature 1052 is within the cavity 1014, the retention feature 1052 returns to its original (circular, non-deformed) shape, and the top case 1008 is secured to the bottom case 1010. Also, the retention feature 1052 may extend around the outer peripheral region of the top case 1008 and the bottom case 1010.

Figure 26:
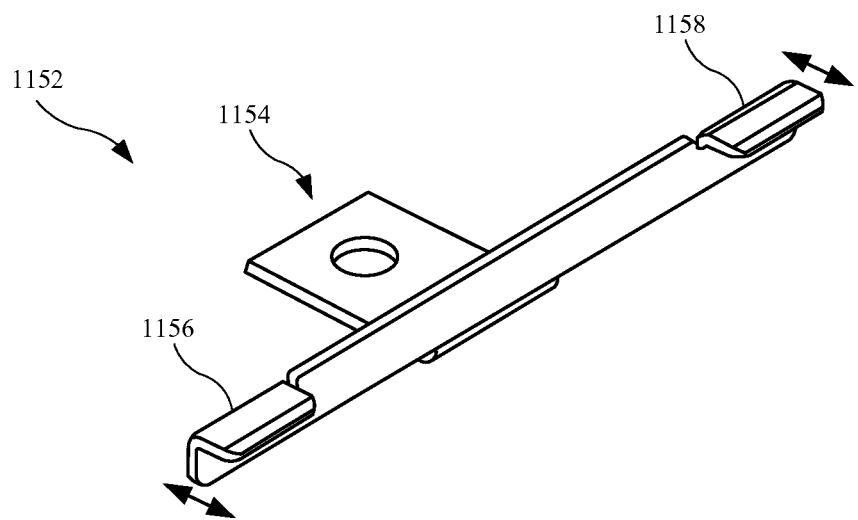
FIG. 26 illustrates an isometric view of an embodiment of a retention feature formed from a spring member.

FIG. 26 illustrates an isometric view of an embodiment of a retention feature 1152 formed from a spring member. The retention feature 1152 may include a central portion 1154 designed to engage a top case (not shown) of a portable computing device. The retention feature 1152 further includes a first spring member 1156 and a second spring member 1158, both of which are designed to bend or deform in order to create a tension against a bottom case (not shown) of a portable computing device. In some embodiments, the retention feature 1152 is formed from a dense material (e.g., hard plastic) or a metal (e.g., steel, aluminum). The arrows indication the ability of the first spring member 1156 and the second spring member 1158 to flex or bend in the direction of the arrows.

Figure 27:
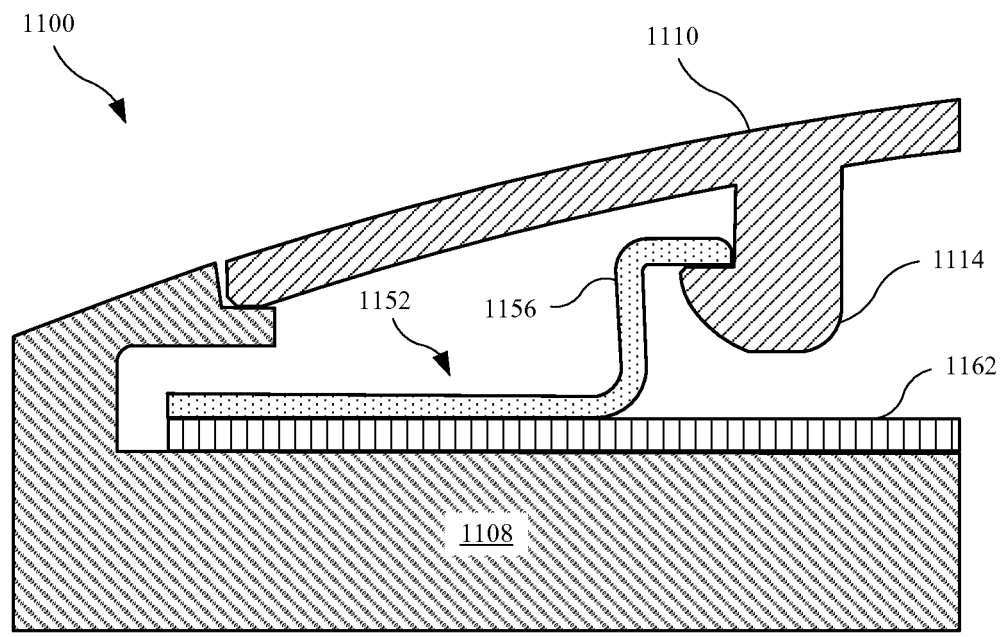
FIG. 27 illustrates a cross sectional view of the embodiment of the retention feature shown in FIG. 26 applied to a portable computing device.

FIG. 27 illustrates a cross sectional view of the embodiment of the retention feature 1152 shown in FIG. 26 applied to a portable computing device 1100. As shown, the retention feature 1152 may be mounted on a retention securing feature 1162 coupled with the top case 1108. The bottom case 1110 may include a hook member 1114 designed to engage the first spring member 1156 and create a force or tension between the hook member 1114 and the first spring member 1156. It will be appreciated that the second spring member 1158 (shown in FIG. 26) engages a second hook member (not shown) of the bottom case 1110.

Figure 28:
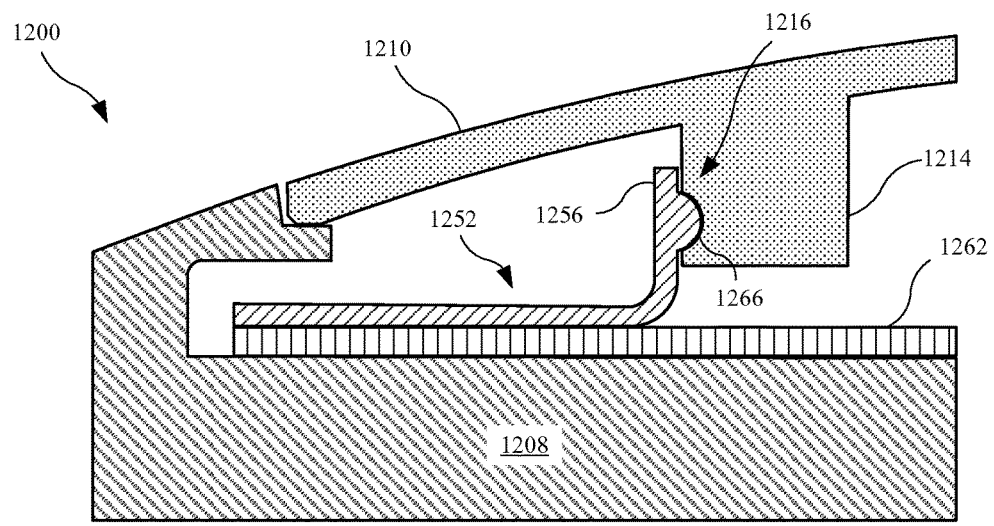
FIG. 28 illustrates a cross sectional view showing an alternate embodiment of a spring member having a protruding feature that engages a cavity of a bottom case of a portable computing device.

FIG. 28 illustrates a cross sectional view showing an alternate embodiment of the retention feature 1152 shown in FIG. 27. In FIG. 25, a retention feature 1252 includes a protruding feature 1266 on a first spring member 1256 that engages a cavity 1216 of a bottom case 1210 of a portable computing device 1200. In particular, the cavity 1216 is formed on a protrusion 1214 of the bottom case 1210. The protruding feature 1266 offers further tension and engagement (in terms of surface area) between the retention feature 1252 and the protrusion 1214. In this manner, the top case 1208 may be further secured to the bottom case 1210. Also, as shown the retention feature 1252 may be mounted on a retention securing feature 1262 coupled with the top case 1208. Also, the first spring member 1256 is capable of bending or flexing in a manner similar to the first spring member 1156 (shown in FIG. 27). Also, the retention feature 1252 may be formed from any material or materials used to form the retention feature 1152 (shown in FIG. 27).

Figure 29:
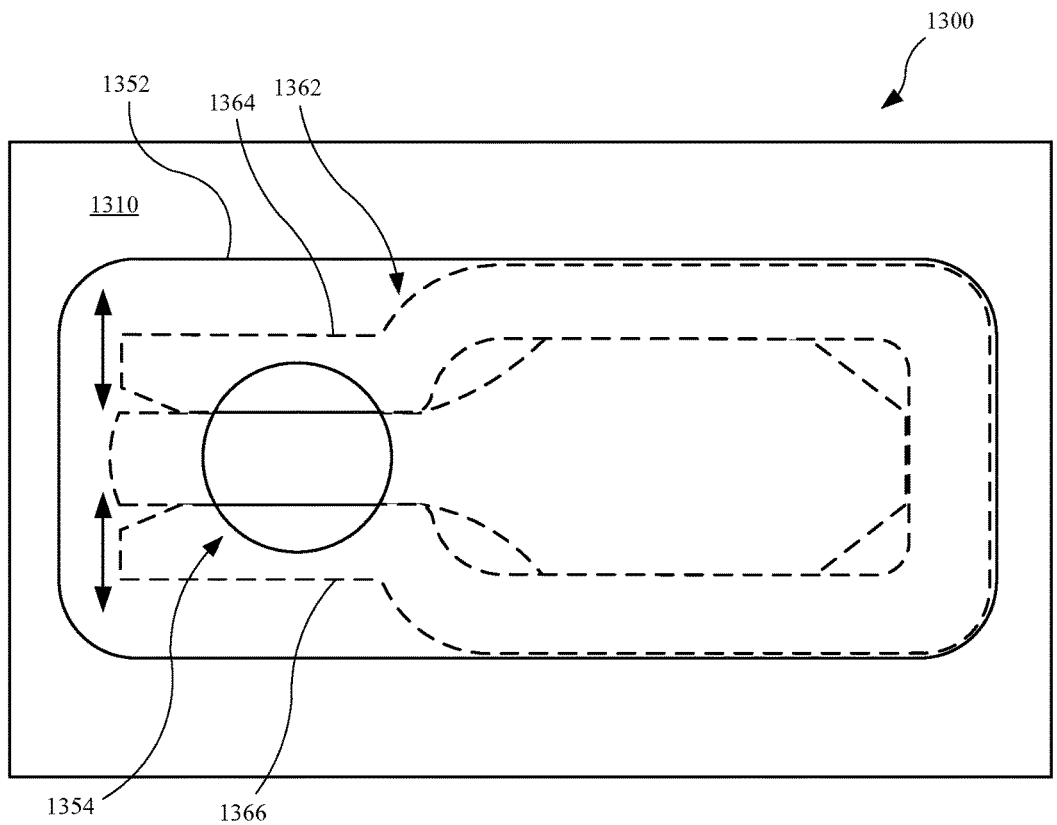
FIG. 29 illustrates a plan view of an embodiment of a retention feature that encloses a snap member within the outer peripheral region of the retention feature.

FIG. 29 illustrates a plan view of an embodiment of a retention feature 1352 that encloses a snap member 1362 within the outer peripheral region of the retention feature 1352. As shown, the retention feature 1352 is located on a bottom case 1310 of a portable computing device 1300. The retention feature 1352 includes an opening 1354 designed to receive a protrusion (e.g., first protrusion 132, shown in FIG. 6). The snap member 1362 may be formed from any material or materials used to form the first snap member 162 (shown in FIG. 6). Also, the snap member 1362 includes a first extension 1364 and a second extension 1366 designed to bend or deform (designated by the direction of the arrows) to receive a protrusion, in accordance with the described embodiments. The first extension 1364 and the second extension 1366 can return to their original respective positions while engaging the protrusion, or a tapered region of the protrusion, once a force is no longer applied to the first extension 1364 and the second extension 1366.

In the embodiments shown throughout this detailed description, some features may be located on different structural elements. That is, structures shown one portion (i.e., the top case or the bottom case) may be designed or formed on the corresponding portion (i.e., the bottom case or the top case). For example, in some embodiments, the first retention feature 152 (shown in FIG. 5) may be located on the interior portion 120 of the top case 108 (shown in FIG. 3). Accordingly, in some embodiments, the first protrusion 132 (shown in FIG. 3) may be located on the interior portion 160 of the bottom case 110 (shown in FIG. 5).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An enclosure of a portable computing device, comprising:
   a first portion including a protrusion extending from an interior portion of the first portion, the protrusion including a tapered region;
   a second portion including an interior region that includes a retention feature that receives a snap member extending from the retention feature, the retention feature further including a tab member that secures the snap member with the retention feature; and
   wherein the tapered region engages the snap member to secure the first portion with the second portion.

2. The enclosure of claim 1, wherein the snap member comprises a wire capable of deforming to receive the tapered region.

3. The enclosure of claim 2, wherein the wire includes a U-shape.

4. The enclosure of claim 2, wherein the wire includes a first extension and a second extension, and wherein the first extension and the extension engage the tapered region to mechanically couple the first portion with the second portion.

5. The enclosure of claim 1, wherein the tab member comprises an extension positioned around a portion of the snap member.

6. The enclosure of claim 1, wherein the retention feature includes a grooved region having an additional material removable region allowing the snap member to pivot about the retention feature.

7. The enclosure of claim 1, wherein the first portion includes a top case of the portable computing device, and wherein the second portion includes a bottom case of the portable computing device.

8. A portable computing device, comprising:
 a top case including a protrusion, the protrusion including a first tapered region and a second tapered region;
 a bottom case including a retention feature, the retention feature including a grooved region;
 a snap member positioned within the grooved region, the snap member including a first extension and a second extension, the first extension and the second extension extending beyond the retention feature;
 a tab member designed to secure the snap member with the retention feature; and
 wherein the first tapered region and the second tapered region of the protrusion engage the first extension and the second extension of the snap member to secure the top case with the bottom case.

9. The portable computing device of claim 8, wherein the grooved region further comprises a material removal region.

10. The portable computing device of claim 9, wherein the snap member is capable of pivoting about the retention feature based upon the material removal region.

11. The portable computing device of claim 8, wherein the retention feature is integrally formed with the bottom case, and wherein the tab member is integrally formed with the retention feature.

12. The portable computing device of claim 8, wherein the top case includes rib structure that receives the protrusion, and wherein the tab member is separate from the retention feature.

13. The portable computing device of claim 12, wherein the protrusion is adhesively secured with the top case.

14. The portable computing device of claim 12, wherein the protrusion is integrally formed with the top case.

15. A method for assembling a portable computing device, the method comprising:
 receiving a snap member at a retention feature coupled with a bottom case of the portable computing device; and
 receiving, at the snap member, a protrusion coupled with a top case of the portable computing device.

16. The method of claim 15, wherein receiving the snap member at the retention feature coupled with the bottom case comprises removing additional material in the retention feature to define a grooved region in the retention feature that allows the snap member to pivot about the retention feature.

17. The method of claim 15, wherein receiving, at the snap member, the protrusion comprises receiving, at the snap member, a tapered region of the protrusion.

18. The method of claim 17, wherein receiving, at the snap member, the protrusion further comprises:
 engaging the protrusion with the snap member;
 extending the snap member from a first position to a second position; and
 returning the snap member to the first position to engage the tapered region of the protrusion.

19. The method of claim 15, wherein receiving the snap member at the retention feature coupled with the bottom case comprises:
 integrally forming a tab member with the retention feature; and
 securing the snap member with the retention feature via the tab member.

20. The method of claim 15, further comprising:
 removing additional material in the bottom case to define a cavity in the bottom case;
 and receiving, at the cavity, a portion of the protrusion.

* * * * *